Feb. 23, 1937.　　F. A. HARTGEN　　2,072,072
IRON METALLURGY
Filed Sept. 1, 1933
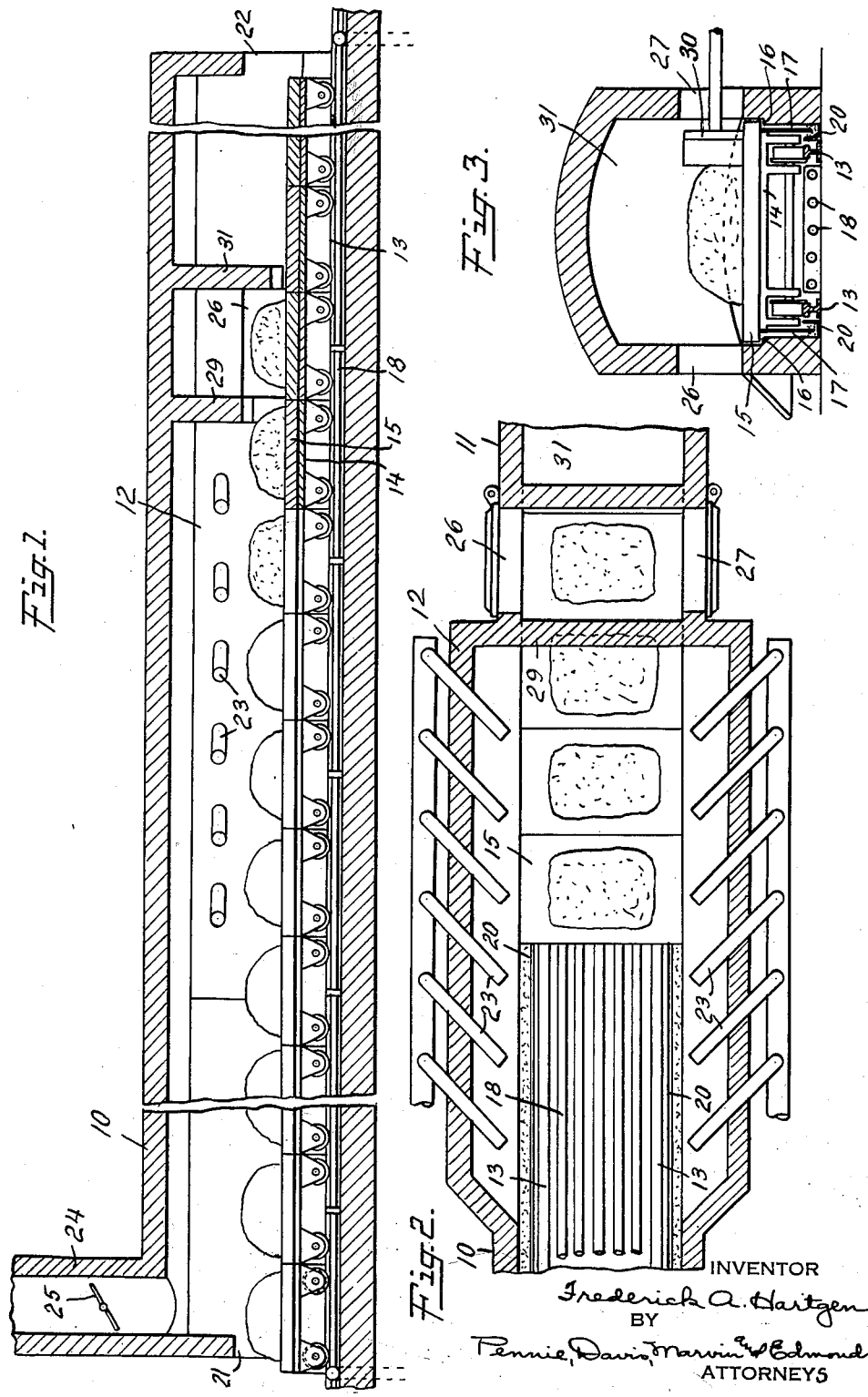

Patented Feb. 23, 1937

2,072,072

UNITED STATES PATENT OFFICE 2,072,072

IRON METALLURGY

Frederick A. Hartgen, Reading, Pa., assignor to Reading Iron Company, Reading, Pa., a corporation of Pennsylvania Application September 1, 1933, Serial No. 687,740

9 Claims. (Cl. 75—32).

This invention relates to metallurgy and has for an object the provision of an improved method and apparatus for treating iron oxide ores to produce metallic iron. The invention further contemplates the production of a novel metallic iron product of high quality.

According to the method of the invention, a charge containing iron oxide ore, which usually contains one or more solid impurities of an acid character such, for example, as silica ($SiO_2$) and phosphoric acid ($P_2O_5$), is heated to a temperature below the melting point of iron in intimate contact with a reducing agent to reduce iron oxide contained in the ore to metallic iron. The reducing treatment is discontinued before complete reduction of the iron oxide to metallic iron is accomplished in order to retain in the reduced charge sufficient iron oxide to form with impurities contained in the charge a slag which is fusible at a temperature below the melting point of iron.

The temperature employed for reduction is preferably such that melting of the charge is avoided and a reduced charge containing metallic iron in the solid state is formed. When reduction of the desired amount of iron oxide to metallic iron has been accomplished, the reduced mass is heated to a temperature at which the unreduced iron oxide and the impurities of the charge form a fluid slag which may be separated from the metallic iron. The reduced mass may be heated to a temperature above the melting point of the metallic iron contained in the mass or to a temperature below the melting point of the iron. When the reduced mass is heated to a temperature above the melting point of the iron in a suitable receptacle, the metallic iron and slag form distinct fluid layers which may be separated readily. The molten iron is of high quality, and it may be cast in suitable molds. When the reduced mass is heated to a temperature below the melting point of the iron, the heated mass is subjected to a squeezing or forging operation to produce a solid coherent product and to remove excess slag. The resulting product is similar to wrought iron products produced heretofore in that it contains slag inclusions and is of substantially the same degree of purity.

Any suitable gaseous, liquid, semi-liquid, semi-solid or solid reducing agent may be employed for accomplishing reduction.

When a gaseous reducing agent is employed, it is preferably passed in intimate contact with a porous charge of finely divided ore until reduction to the desired extent has been accomplished. The resulting partially reduced iron product may then be heated, preferably in agglomerated form, to form a fluid slag which can be separated from the metallic iron.

When liquid, semi-liquid, semi-solid or solid reducing agents are employed, they are preferably intimately mixed with the ore in finely divided condition, and the mixtures formed into briquettes or agglomerates of such sizes that they may be heated readily to suitable reducing temperatures. The amount of reducing agent incorporated in the mixture will depend upon the nature of the reducing agent and the amounts of impurities contained in the ore and the reducing agent. The amount of reducing agent employed should be incapable of effecting complete reduction of the iron oxide to metallic iron, provision being made for the retention of an amount of iron oxide sufficient to form a fusible slag with the impurities at the desired temperature of separation of the slag and metallic iron. Satisfactory results may be achieved by incorporating in the charge an amount of reducing agent slightly less than the theoretical amount required for complete reduction of the iron oxide contained in the charge. The exact amount of reducing agent employed will, of course, depend upon the amount of iron oxide to be reduced, but some degree of control of reduction is provided through the formation of iron silicate ($FeO.SiO_2$) from which the iron oxide is not easily reduced, and amounts of reducing agents substantially equal to or somewhat in excess of the theoretical amounts required for accomplishing the desired degree of reduction may be employed without harmful results.

Iron oxide ores generally contain considerable amounts of solid impurities such as silica ($SiO_2$) and phosphoric acid ($P_2O_5$), and if they are treated directly according to the process, the production of the desirable slag may result in a waste of considerable iron oxide. In order to avoid wasting iron oxide, it is desirable to concentrate relatively impure ores to reduce the content of impurities. According to the preferred process of the invention, iron oxide ores containing excessive amounts of such impurities are concentrated to reduce the silica content to about 3% or less. Concentration of the ore to reduce the silica content also results in a reduction of the phosphoric acid content.

Any of the usual iron oxide-bearing materials such, for example, as magnetite, limonite and hematite ores, may be treated successfully according to the method of the invention.

Any suitable method of concentration may be employed for removing impurities from the iron oxide-bearing material, if removal of impurities is desirable or necessary. Thus, for example, magnetite ore may be subjected to a suitable magnetic concentrating operation, and limonite and hematite may be subjected to suitable gravity concentrating operations.

Instead of concentrating impure ores prior to reduction, such ores may be first subjected to suitable reducing temperatures with suitable amounts of reducing agent to accomplish the desired degree of reduction, and the resulting sponge iron products may be cooled and concentrated or purified to establish therein the amounts of impurities and unreduced oxides required for forming slags of suitable volumes and compositions. The resulting materials may then be formed into briquettes or agglomerates and heated to desirable temperatures (1300 to 1450° C., for example) at which masses of solid iron interspersed with fluid slags are formed. Such masses may then be subjected to suitable treatments for the separation of slag and metallic iron.

When solid carbonaceous materials such, for example, as coal are employed as reducing agents, further quantities of impurities such as ash and sulphur are introduced into the charges, and provision must be made for retaining sufficient unreduced oxide to form slag with such impurities in addition to the impurities of the ore.

Slags containing various amounts of iron oxide are suitably fusible within the temperature range employed in the process, and slags of various volumes, therefore, may be obtained. The volume of slag produced will be determined, within certain limits, by its effectiveness in absorbing impurities from the charge. In general, in the treatment of an ore containing not more than about 3% of silica, slag equal in weight to about 5 to 25% of the weight of the reduced mass satisfactorily absorbs the impurities of the charge, including sulphur which may have been introduced into the charge by means of a solid carbonaceous reducing agent. It is desirable to avoid the formation of slags having compositions corresponding to the composition of fayalite.

In the separation of the metallic iron and slag following the reducing treatment, the impurities are substantially completely removed. When a wrought iron product is to be produced, the reduced mass is forged or squeezed until the slag content has been reduced to about 3% of the weight of the squeezed or forged product. This slag content is similar to the slag content of wrought iron produced heretofore, but the distribution of the slag differs in the two products, the slag in the product of the invention being present in finer filaments and being more uniformly distributed.

Many iron ores have an intrinsic silica content of about 0.5 to 2.0%. The intrinsic silica is distributed throughout the iron mineral crystals and when such crystals become iron crystals through reduction, an iron oxide-silica slag product having the formula $XFeO.SiO_2$ is entrapped. When the reduced product is heated to the melting point of the slag, the product $XFeO.SiO_2$ decomposes as follows:

$$XFeO.SiO_2 \rightarrow XFe + (FeO)(Fe_2O_3).SiO_2$$

The precipitated iron provides a good bond between the slag and the surrounding iron. The silicate slag is in equilibrium with the surrounding solid iron dispersed throughout the original crystals of the iron. None of the wrought iron products produced heretofore contains silicate slag in equilibrium with solid iron dispersed throughout the original crystals of the iron.

According to a preferred process of the invention a porous agglomerated charge of mixed iron ore and solid carbonaceous reducing agent is heated gradually to a temperature of about 1300 to 1450° C., the heating being controlled to permit expulsion of the volatile components of the agglomerates without disrupting the agglomerates and to permit reduction of the desired amount of iron oxide before a temperature at which the entire charge is fusible is attained. After completion of the desired reduction and when the slag becomes molten, the reduced charge is subjected to squeezing or forging to reduce the slag content to about 3% of the weight of the squeezed or forged product.

Suitable apparatus for carrying out the above-described heating operation is shown in the accompanying drawing, in which Fig. 1 is a longitudinal sectional elevation of a tunnel kiln;

Fig. 2 is a sectional plan of the central portion of the tunnel kiln shown in Fig. 1; and Fig. 3 is a transverse section of the tunnel kiln shown in Fig. 1.

The tunnel kiln shown in the drawing may be of any suitable masonry construction. The opposite end portions 10 and 11 are of similar and uniform width. The central portion 12 is somewhat wider than the end portions, providing an enlarged heating or combustion chamber.

Tracks or rails 13 for receiving charge cars 14 are provided within the kiln. The upper surfaces of the cars 14 are formed by slabs 15 of good heat insulating and heat refractory material which are of substantially the same width as the interior width of the kiln. The slabs 15 project over ledges 16 formed integrally with the side walls of the kiln and which extend the entire length of the kiln.

Flanges 17, depending from the under-carriages of the cars, project into sand-filled troughs between the side walls of the kiln and flanges 20 projecting upwardly from the floor of the kiln, forming seals protecting the under-carriages of the cars from contact with gases from the upper portion of the kiln. The bottom portion of the kiln may be provided with a system of pipes 18 for the circulation of water for cooling.

The entrance or charging end 10 of the kiln is provided with an opening 21 through which the cars may be introduced into the kiln. A similar opening 22 is provided in the exit end of the kiln. The charging opening 21 is provided with a door (not shown) for sealing the charging end portion of the kiln against ingress or egress of gases.

Burners 23 for introducing combustible mixtures of oxidizing gas and fluid or powdered solid fuel project through the side walls of the heating or combustion chamber 12.

The burners are so arranged that the streams of combustible mixtures are introduced angularly and the resulting combustion gases tend to flow toward the charging or entrance end portion of the kiln. The charging end portion of the kiln communicates with a vertical stack 24, having an adjustable damper 25 therein, through which the products of combustion may pass to the atmosphere.

Openings 26 and 27 are provided in the opposite side walls of the kiln adjacent the end of the combustion chamber remote from the charging end of the kiln to permit the removal of reduced masses from the cars. The openings 26 and 27 are of the same dimensions and both have lower sills or surface boundaries disposed at substantially the same elevation as the upper surfaces of the cars to permit removal of the reduced masses from either side of the kiln by means of a ram 30. The ram 30 may be provided with suitable operating mechanism (not shown). Suitable doors (not shown) are provided for sealing the openings 26 and 27 when not in use.

A wall 31 extending between the side walls and from the roof to a point adjacent the upper surface level of the cars is provided adjacent the openings 26 and 27 for aiding in confining hot gases within the combustion chamber and the charging end portion of the kiln. A second wall 29 extending between the side walls and from the roof to a point adjacent the upper surfaces of the charges on the cars is provided on the opposite sides of the openings 26 and 27 to aid in retaining the flames and hot gases within the combustion chamber during discharging operations. The walls 29 and 31 are preferably arched to provide strength.

A kiln suitable for practical operation may have an over-all length about two hundred feet and it may be of any suitable interior width, say about 3 to 5 feet. The discharge openings 26 and 27 may be disposed at about the longitudinal center and the combustion zone may have a length of about 30 feet.

In the use of the apparatus for carrying out a preferred process of the invention, a charge suitable for treatment is formed by preparing an intimate mixture of finely ground iron oxide ore and finely ground coal and briquetting or agglomerating the mixture.

The briquettes or agglomerates may be prepared in any suitable manner, with or without the aid of a binder, but they are preferably prepared by subjecting the charge mixture to high pressures (as high as 100,000 pounds per square inch, for example) without the use of a binder.

Suitable charge materials may, for example, consist, roughly, of magnetite ore or concentrate containing not more than about one percent of silica and bituminous coal containing about 70% fixed carbon, 6% ash and 0.7% sulphur. The ore or concentrate and coal are preferably ground to pass a 65 mesh screen (Tyler series) before mixing and briquetting or agglomerating. The mixture of ore and coal may contain about 87.5% ore and 12.5% coal (both by weight).

The briquettes or agglomerates may have any desired shape or size. The agglomerates employed are preferably cylindrical in form, and about six inches in diameter and four inches in length.

The agglomerates are stacked on the cars, preferably in the form of honeycombed pyramids to provide for circulation therethrough of the hot gases within the kiln, and the loaded cars are introduced into the charging end portion of the kiln and moved through the kiln at the rate of about six inches per minute.

Firing of the kiln is preferably so controlled that the temperature within the kiln varies from about 200° C. immediately adjacent the charging end to about 1450° C. in the hottest portion of the combustion chamber. It is desirable but not essential that a substantially non-oxidizing atmosphere be maintained within the kiln. Strongly oxidizing atmospheres may require the use of larger amounts of reducing agents in the charges.

As the loaded cars pass through the kiln, the temperatures of the agglomerated charges thereon are gradually increased, and elimination of volatile components and reduction of iron oxide proceed. Reduction to the desired degree is substantially completed while the agglomerates are heated to temperatures of about 900° C. to 1100° C. Most of the iron in the charges entering the higher temperature zones is present in the solid metallic state. When the temperature of the charge on each car has reached the maximum temperature attainable within the kiln, the metallic iron contained therein is in a weldable condition and the unreduced iron oxide and impurities are present in the form of a fluid slag. During the course of passage of the charges through the kiln, the briquettes or agglomerates retain their original shapes until reduction has been substantially completed. As the reduced charges pass into and through the zones of higher temperatures, the briquettes or agglomerates gradually shrink in size and merge together, each charge ultimately becoming a coherent mass of solid metallic iron and fluid slag. As each car passes through the combustion chamber and comes into alignment with the discharge doors 26 and 27 adjacent thereto, the reduced charge thereon is removed. The cars, after removal of the reduced charges, pass under the hanging wall 31 and through the remainder of the kiln in which they are cooled gradually to a temperature approaching room temperature by the time they reach the exit end. The cooled cars are returned to the charging end of the kiln for the reception of additional charges.

The hot reduced charges or masses removed from the kiln are preferably subjected immediately to a squeezing or forging treatment during the course of which the slag content is reduced to an amount not exceeding about 3% of the weight of the masses.

If desired, the reduced masses removed from the furnace may be heated in suitable receptacles to temperatures above the melting point of the metallic iron contained therein to form separable fluid layers of metallic iron and slag.

The reduced charges may, if desired, be cooled and stored and subsequently heated to suitable temperatures for effecting separation of slag and metallic iron.

Following is a specific example illustrating results obtained in carrying out a method of the invention:

Magnetite ore or concentrate and bituminous coal of the following compositions were ground to pass a 65 mesh screen, intimately mixed in the proportions of 87.5% ore and 12.5% coal (both by weight), and formed into briquettes:

Ore

| | Per cent |
|---|---|
| Fe | 70.610 |
| $SiO_2$ | 0.830 |
| P | 0.042 |

Coal

| | Per cent |
|---|---|
| Fixed carbon | 70.00 |
| Sulphur | 0.69 |
| Ash | 6.00 |

A charge of the briquettes was heated gradually to a temperature of about 900° C. and maintained at a temperature between 900° C. and 1100° C. until consumption of the reducing agent and consequent reduction of iron oxide to the desired extent were completed. The resulting reduced mass which was entirely solid was heated to a temperature of about 1400° C. Heating of the reduced mass resulted in the formation of a fluid slag and the conversion of the solid metallic iron to a weldable state. The heated mass was subjected to a forging treatment to eliminate excessive slag and a solid mass of metallic iron was produced. The metallic iron product and the slag product were of the following compositions:

*Iron product*

| | Per cent |
|---|---|
| Total carbon | 0.040 |
| Manganese | None |
| Phosphorus | 0.070 |
| Sulphur | 0.043 |
| Silicon | 0.125 |
| Slag and oxide | 1.960 |

*Slag product*

| | Per cent |
|---|---|
| MnO | 0.10 |
| $P_2O_5$ | 0.85 |
| $SiO_2$ | 9.68 |
| FeO | 56.46 |
| $Fe_2O_3$ | 24.12 |
| $Al_2O_3$ | 2.69 |
| FeS | 5.41 |

The process of the invention is capable of producing metallic iron products of superior properties and compositions. In the manufacture of wrought iron by the puddling process, the crystals of substantially pure iron separate from the bath and enclose slag between the crystals. The iron crystals themselves are, however, substantially free from silicate inclusions. This limits the degree of dispersion of the silicate since there will always be a limit to the size of an individual iron crystal which is free from slag. In the case of the shotting process, the silicate is dispersed through molten iron and hence individual crystals may enclose silicate. This silicate, however, is not in equilibrium with solid iron, but is chilled from a state where it is strongly oxidizing to solid iron. In wrought iron produced in accordance with the present invention, the particles of silicates or slag are in equilibrium with the solid iron. Such a condition results in more uniform distribution of the slag than is found in irons made by the other processes and substantially prevents carbon segregation and the consequent formation of blisters in subsequent fabrication.

The wrought iron produced by the process of the present invention is similar in composition and physical properties to wrought iron produced by other processes. The process of the present invention, permits ready control of the content of the various constituents within wide limits in the wrought iron range. Wrought iron made in accordance with the process of the invention consists substantially of pure iron containing particles of a silicate of iron in equilibrium with solid iron dispersed throughout the original crystals of said iron and in the grain boundaries.

I have succeeded in producing alloys such, for example, as corrosion and heat-resisting and wear-resisting iron products by the introduction of such alloying elements as copper, nickel, chromium, aluminum and manganese. I prefer to introduce these elements either as metal powders or as carbonates or oxides by intimate mixing with the pulverulent ore and reducing agent before briquetting or agglomerating, and the process from this stage is essentially as hereinbefore described.

I have also produced wrought irons containing small percentages of aluminum which were resistant to both high temperatures and to corrosion. In these cases, I introduced the aluminum as the metal powder or as salts of aluminum into the pulverulent iron oxide-bearing material before briquetting or agglomerating. Similarly, metallic copper or salts of copper may be added as well as other elements which will give specific properties to the iron.

In forming alloys in accordance with the method of the invention, I prefer to employ the reagents in such proportions as to form products containing about 1 to 5 percent by weight of the alloying constituents.

The present invention provides an effective process for treating low-grade ores to produce high-grade iron products. The process of the invention also permits the utilization of low-grade carbonaceous fuels as reducing agents. By virtue of the fact that the metallic iron is produced in a substantially solid state in conjunction with a fluid slag, undesirable substances such as phosphorus and sulphur which may be present in the ore and reducing agent may be readily removed. Phosphoric acid is not reduced to any substantial extent at the reducing temperatures employed, and iron sulphide is practically insoluble in solid iron and readily soluble in the fluid slags produced. The extent of the sulphur and phosphorus elimination may be controlled by controlling the amount of slag produced and the amount of slag separated from the metallic iron.

In the appended claims, the expression "iron oxide ore" is intended to include all materials containing oxygen chemically combined with iron and which are amenable to treatment by the process of the invention.

I claim:

1. The method of treating iron oxide ore consisting essentially of iron oxide and one or more impurities of an acid character which comprises heating the ore, without the addition of fluxing material, in intimate contact with a reducing agent to a temperature of about 900 to 1100° C. until a large proportion but not all of the iron oxide is reduced to metallic iron, the amount of iron oxide remaining unreduced being sufficient to form a slag with the impurities which is fusible at a temperature of about 1300 to 1450° C. and substantially infusible at temperatures below about 1300° C., heating the resulting reduced product to a temperature above about 1300° C. and treating the resulting heated product to separate metallic iron and fluid slag contained therein.

2. The method of treating iron oxide ore consisting essentially of iron oxide and one or more impurities of an acid character which comprises heating the ore, without the addition of fluxing material, in intimate contact with a reducing agent to a temperature of about 900 to 1100° C. until a large proportion but not all of the iron oxide is reduced to metallic iron, the amount of iron oxide remaining unreduced being sufficient to form a slag with the impurities which is fusible at a temperature of about 1300 to 1450° C. and substantially infusible at temperatures below about 1300° C., heating the resulting reduced product to a temperature of about 1300 to 1450°

C., and subjecting the resulting heated product to a forging or squeezing treatment to separate metallic iron and fluid slag contained therein.

3. The method of treating iron oxide ore containing one or more impurities of an acid character which comprises heating the ore, without the addition of fluxing material, in intimate contact with a reducing agent to a temperature of about 900 to 1100° C. until a large proportion but not all of the iron oxide is reduced to metallic iron, cooling the resulting product, concentrating the cooled product to remove impurities in excess of the amount which will form a slag with unreduced iron oxide in the concentrated product which is fusible at a temperature of about 1300 to 1450° C. and substantially infusible at temperatures below about 1300° C., heating the concentrated product to a temperature above about 1300° C., and treating the heated product to separate metallic iron and fluid slag contained therein.

4. The method of treating iron oxide ore containing one or more impurities of an acid character which comprises heating the ore, without the addition of fluxing material, in intimate contact with a reducing agent to a temperature of about 900 to 1100° C. until a large proportion but not all of the iron oxide is reduced to metallic iron, cooling the resulting product, concentrating the cooled product to remove impurities in excess of the amount which will form a slag with unreduced iron oxide in the concentrated product which is fusible at a temperature of about 1300 to 1450° C. and substantially infusible at temperatures below about 1300° C., heating the concentrated product to a temperature of about 1300 to 1450° C., and subjecting the resulting heated product to a forging or squeezing treatment to separate metallic iron and fluid slag contained therein.

5. The method of producing metallic iron from an ore consisting essentially of iron oxide and one or more impurities of an acid character which comprises forming a mixture consisting essentially of the ore and a carbonaceous reducing agent and substantially free of fluxing material, and heating the resulting mixture to a temperature at which the iron oxide is reduced and solid metallic iron is formed, the amount of reducing agent employed being controlled to prevent reduction of all of the iron oxide and to retain an amount of iron oxide capable of forming a liquid slag with impurities contained in the mixture at a temperature below the melting point of iron.

6. The method of producing metallic iron from an ore consisting essentially of iron oxide and one or more impurities of an acid character which comprises forming a mixture consisting essentially of the ore and a carbonaceous reducing agent and substantially free of fluxing material, heating the resulting mixture to a temperature at which the iron oxide is reduced and solid metallic iron is formed, the amount of reducing agent employed being controlled to prevent reduction of all of the iron oxide and to retain an amount of iron oxide capable of forming a liquid slag with impurities contained in the mixture at a temperature below the melting point of iron, heating the reduced mixture to form a liquid slag at a temperature below the melting point of iron, and subjecting the resulting heated product to a forging or squeezing operation to separate metallic iron and liquid slag contained therein.

7. The method of producing metallic iron from an ore consisting essentially of iron oxide and one or more impurities of an acid character which comprises forming a mixture consisting essentially of the ore and a carbonaceous reducing agent and substantially free of fluxing material, and heating the resulting mixture to a temperature of about 1300 to 1450° C. to reduce the iron oxide and form solid metallic iron, the amount of reducing agent employed being controlled to prevent reduction of all of the iron oxide and to retain an amount of iron oxide capable of forming a liquid slag with impurities contained in the mixture at the temperature employed.

8. The method of producing metallic iron from an ore consisting essentially of iron oxide and one or more impurities of an acid character which comprises forming a mixture consisting essentially of the ore and a carbonaceous reducing agent and substantially free of fluxing material, heating the resulting mixture to a temperature of about 1300 to 1450° C. to reduce the iron oxide and form solid metallic iron, the amount of reducing agent employed being controlled to prevent reduction of all of the iron oxide and to retain an amount of iron oxide capable of forming a liquid slag with impurities contained in the mixture at the temperature employed, and subjecting the resulting product to a forging or squeezing operation to separate metallic iron and liquid slag contained therein.

9. The method of producing wrought iron which comprises forming a substantially flux-free charge mixture consisting essentially of a carbonaceous reducing agent and an ore consisting essentially of iron oxide and one or more impurities of an acid character including silica in an amount not exceeding about 3% of the weight of the ore, heating the resulting mixture to a temperature at which the iron oxide is reduced and solid metallic iron is formed, the amount of reducing agent employed being controlled to prevent reduction of all of the iron oxide and to retain an amount of iron oxide capable of forming a liquid slag with impurities contained in the mixture at a temperature below the melting point of iron, heating the reduced mixture to form a liquid slag at a temperature below the melting point of iron, and subjecting the resulting heated product to a forging or squeezing operation to separate metallic iron and liquid slag contained therein.

FREDERICK A. HARTGEN.